United States Patent
Berry et al.

(10) Patent No.: US 12,522,353 B2
(45) Date of Patent: Jan. 13, 2026

(54) ATTACHMENT SUB-SYSTEMS FOR VERTICALLY-STACKED MULTICOPTERS

(71) Applicant: Kitty Hawk Corporation, Palo Alto, CA (US)

(72) Inventors: Benjamin Otto Berry, Mountain View, CA (US); Graham Bowen-Davies, San Jose, CA (US); Madeline Elliott Parker, San Francisco, CA (US); Cameron Robertson, San Mateo, CA (US); Christopher Scott Saunders, San Jose, CA (US)

(73) Assignee: Kitty Hawk Corporation, Palo Alto, CA (US)

( * ) Notice: Subject to any disclaimer, the term of this patent is extended or adjusted under 35 U.S.C. 154(b) by 0 days.

(21) Appl. No.: 19/047,320

(22) Filed: Feb. 6, 2025

(65) Prior Publication Data
US 2025/0178726 A1    Jun. 5, 2025

Related U.S. Application Data

(63) Continuation of application No. 18/435,742, filed on Feb. 7, 2024, now Pat. No. 12,252,239, which is a continuation of application No. 17/513,256, filed on Oct. 28, 2021, now Pat. No. 11,939,046.

(60) Provisional application No. 63/107,089, filed on Oct. 29, 2020.

(51) Int. Cl.
*B64C 39/02*    (2023.01)
*B64C 27/08*    (2023.01)
*B64U 10/13*    (2023.01)
*B64U 30/20*    (2023.01)
*B64U 80/70*    (2023.01)

(52) U.S. Cl.
CPC .............. *B64C 39/02* (2013.01); *B64C 27/08* (2013.01); *B64C 39/024* (2013.01); *B64C 2211/00* (2013.01); *B64U 10/13* (2023.01); *B64U 30/20* (2023.01); *B64U 80/70* (2023.01)

(58) Field of Classification Search
CPC ..... B64C 27/08; B64C 2211/00; B64U 10/13; B64U 30/20
See application file for complete search history.

(56) References Cited

U.S. PATENT DOCUMENTS

| | | | |
|---|---|---|---|
| 4,695,012 A * | 9/1987 | Lindenbaum | B64B 1/24 244/26 |
| 2011/0266809 A1* | 11/2011 | Calverley | B64C 27/02 290/55 |
| 2017/0261999 A1* | 9/2017 | Van Voorst | G08G 5/22 |
| 2017/0291704 A1* | 10/2017 | Alegria | G08G 5/55 |
| 2019/0217952 A1* | 7/2019 | Zawadzki | B64D 1/02 |
| 2019/0283871 A1* | 9/2019 | Wieczorek | B64U 10/60 |

* cited by examiner

*Primary Examiner* — Kimberly S Berona
*Assistant Examiner* — Steven J Shur
(74) *Attorney, Agent, or Firm* — Van Pelt, Yi & James LLP

(57) ABSTRACT

A plurality of vertically-stacked multicopters detachably couples to a vertical connector to transport a load that is detachably coupled to the vertical connector. In the event an indication signal of a beam break sensor indicates the vertical connector has broken the beam, the movable gate is configured to close so that the vertical connector is enclosed at least in part by the movable gate. An opening in a frame provides access for the vertical connector to access the beam of the beam break sensor.

16 Claims, 10 Drawing Sheets

ATTACHMENT SUB-SYSTEMS FOR VERTICALLY-STACKED MULTICOPTERS

CROSS REFERENCE TO OTHER APPLICATIONS

This application is a continuation of U.S. patent application Ser. No. 18/435,742 entitled ATTACHMENT SUB-SYSTEMS FOR VERTICALLY-STACKED MULTICOPTERS filed Feb. 7, 2024, which is a continuation of U.S. patent application Ser. No. 17/513,256, now U.S. Pat. No. 11,939,046, entitled ATTACHMENT SUB-SYSTEMS FOR VERTICALLY-STACKED MULTICOPTERS filed Oct. 28, 2021, which claims priority to U.S. Provisional Patent Application No. 63/107,089 entitled ATTACHMENT SYSTEMS FOR VERTICALLY-STACKED MULTICOPTERS filed Oct. 29, 2020, each of which is incorporated herein by reference for all purposes.

BACKGROUND OF THE INVENTION

A contemplated airborne transportation system to move passengers and/or cargo without requiring the use of a runway is to have multiple vertically-stacked multicopters (e.g., quadcopters, octocopters, drones, etc.) carry some transport compartment (e.g., a pod or fuselage for cargo and/or people). The multicopters may be vertical takeoff and landing (VTOL) vehicles and the vertically stacked nature of the multicopters provides sufficient lift with a much smaller footprint compared to other vertical takeoff and landing (VTOL) vehicles (e.g., helicopters). The multicopters may also be smaller, lighter, and/or more energy efficient than existing VTOL vehicles currently used in densely populated areas (e.g., helicopters). Improvements to vertically-stacked multicopter systems which improve the performance of such systems (e.g., increase the uptime-to-downtime ratio, extend the range of such a vertically-stacked multicopter system, etc.) would be desirable.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Various embodiments of a vehicle (e.g., an electric vertical takeoff and landing (eVTOL) vehicle) with an attachment sub-system that permits the vehicle to detachably couple to a vertical connector are described herein. For example, multiple, vertically-stacked vehicles (e.g., multicopters) may attach to a vertical connector to transport a load (e.g., passengers and/or cargo) at the (bottom) end of the vertical connector. In various embodiments, the vertical connector may be a flexible tether, a rigid rod, or some combination of the two. In some applications, vertically-stacked vehicles are desirable for one or more of the following advantages: the payload-to-weight ratio (i.e., more (e.g., power) efficient) is higher than some other types of load-carrying aircraft, they take up less space laterally, and/or there is less ground impact (e.g., with respect to downwash and/or rotor noise). The following figure describes one embodiment of a vehicle with such an attachment sub-system.

Figure 1:
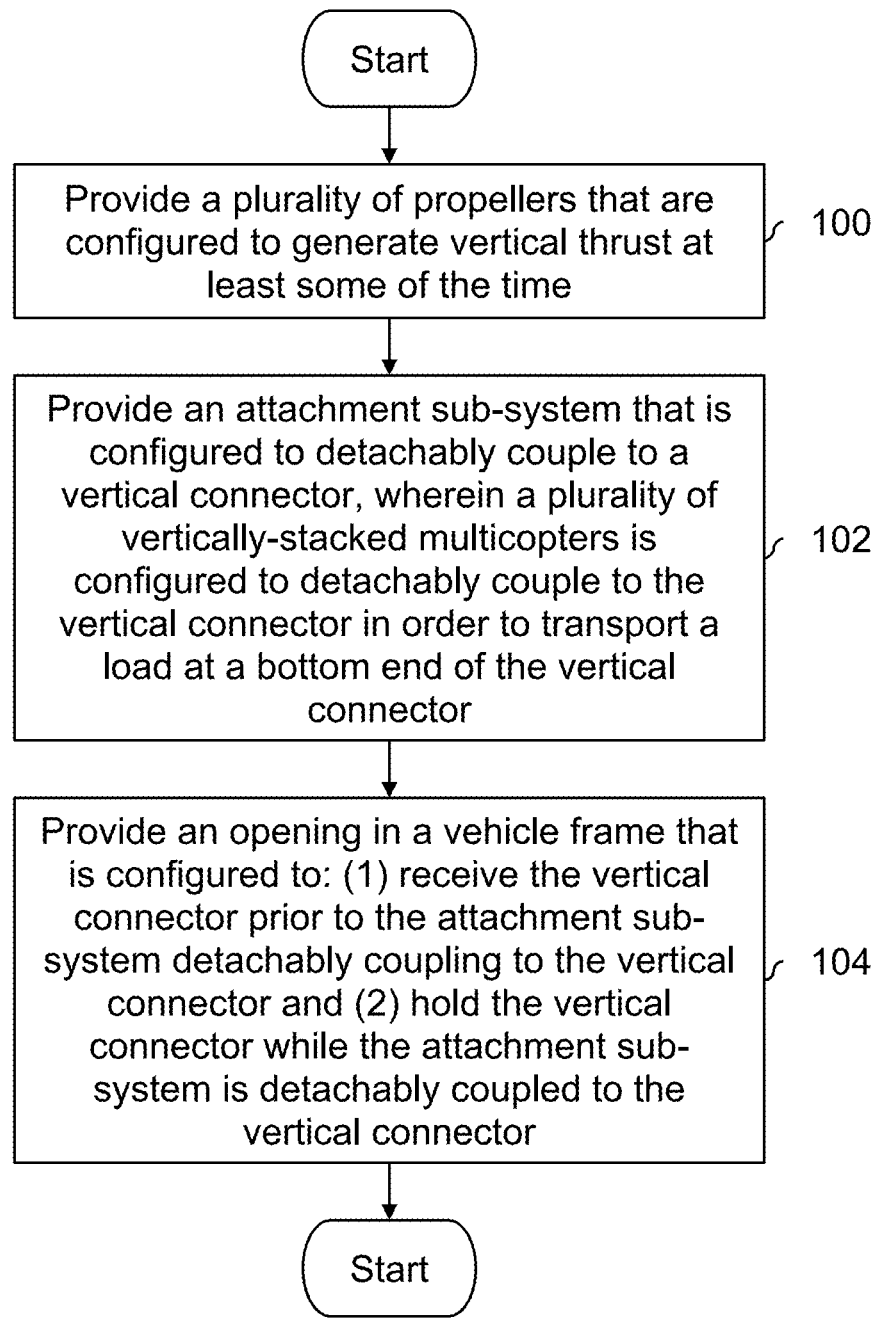
FIG. 1 is a flowchart illustrating an embodiment of a process to provide a system which can detachably couple to a vertical connector via which a load is transported.

FIG. 1 is a flowchart illustrating an embodiment of a process to provide a system which can detachably couple to a vertical connector via which a load is transported. In some embodiments, the system performing the exemplary process of FIG. 1 is a multicopter, such as a quadcopter, an octocopter, etc.

At 100, a plurality of propellers that are configured to generate vertical thrust at least some of the time is provided. In some examples described below, the propellers are fixed, vertical takeoff and landing (VTOL) propellers that always generate vertical thrust. In some other embodiments, at least one of the propellers is some other type of propeller (e.g., a fixed, forward-thrust generated propeller, a tilt rotor, etc.). Propellers that generate vertical thrust may be desirable in at least some applications because then the system (e.g., the multicopter) can take off and land vertically (e.g., for charging), which gives the multicopter a smaller takeoff and landing footprint and/or permits the multicopter to be used in more densely populated areas without a runway.

At 102, an attachment sub-system that is configured to detachably couple to a vertical connector is provided, wherein a plurality of vertically-stacked multicopters is configured to detachably couple to the vertical connector in order to transport a load at a bottom end of the vertical connector.

In some examples described below, the attachment sub-system includes two pairs of cam cleats, where a vertical connector (such as a (e.g., flexible) tether) is held between the two cleats in a given pair. In some embodiments, the attachment sub-system (e.g., further) includes an openable collar (e.g., in addition to and/or as an alternative to the two pairs of cam cleats) that goes around the vertical connector and holds and/or secures the vertical connector when the attachment sub-system and vertical connector are detachably coupled.

At 104, an opening in a vehicle frame is provided that is configured to: (1) receive the vertical connector prior to the attachment sub-system detachably coupling to the vertical connector and (2) hold the vertical connector while the attachment sub-system is detachably coupled to the vertical connector. For example, this opening may permit the vertical connector to be positioned at or near the center of mass of the multicopter when the multicopter is detachably coupled to the vertical connector and becomes load bearing, making carrying the load at the end of the vertical connector easier and/or more efficient.

In some embodiments, the attachment sub-system detachably couples to the vertically connector by (e.g., tightly) gripping the flexible tether. In some other embodiments, the attachment sub-system detachably couples to the vertically connector by (e.g., loosely) encircling or otherwise surrounding to the vertically connector. For example, the vertical connector may include mechanical "stoppers" and the attachment sub-system may include openable "rings" that the stoppers cannot pass through when the rings are closed.

As will be described in more detail below, in some cases, the attachment sub-system and vertical connector decouple or otherwise detach from each other when a multicopter needs to be recharged (e.g., mid-flight and/or without all of the load-carrying and vertically-stacked multicopters having to land). In some cases, the attachment sub-system and vertical connector are decoupled so that the given multicopter can be repositioned along the vertical connector.

It may be helpful to first illustrate an example of how vertically-stacked multicopters may detachably couple to a vertical connector, carry a load at the bottom end of the vertical connector, and decouple from the vertical connector. The following figure describes one such example.

Figure 2:
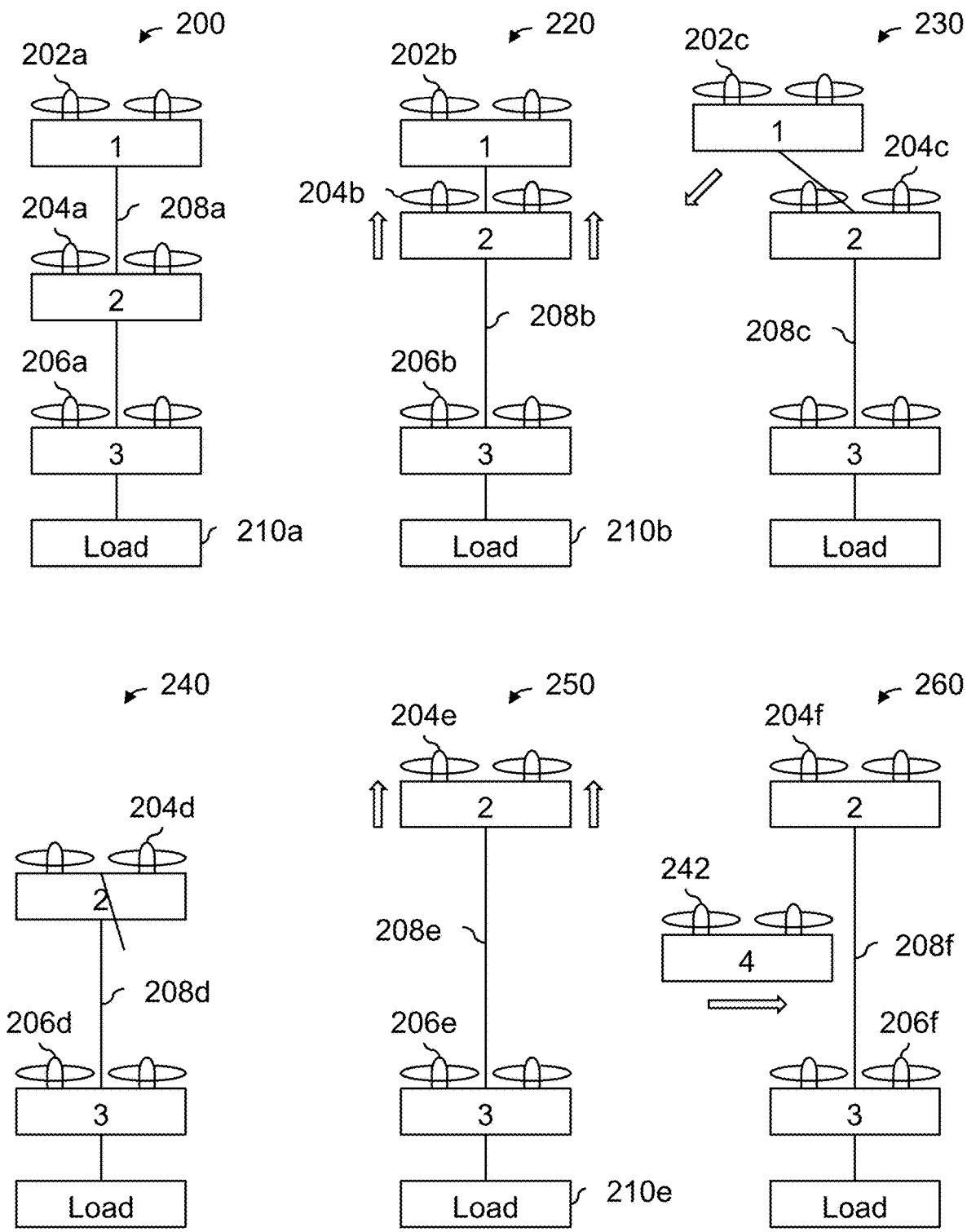
FIG. 2 is a diagram illustrating an embodiment of vertically-stacked multicopters that transport a load where one of the multicopters is replaced by another.

FIG. 2 is a diagram illustrating an embodiment of vertically-stacked multicopters that transport a load where one of the multicopters is replaced by another. In some embodiments, the vertically-stacked multicopters hover midair (e.g., in a fixed position) to make it easier to perform the exemplary multicopter replacement process shown. Using vertically-stacked multicopters to carry a load as shown here may be desirable in some applications because there is built-in redundancy, the footprint is relatively small, and/or the vertical arrangement of multicopters means that the higher multicopters will be further away from the ground, reducing the noise observed by people in the area.

At a first point in time (200), a first multicopter (202a), a second multicopter (204a), and a third multicopter (206a) are detachably coupled to a (e.g., flexible) tether (208a). In some embodiments, the multicopters have the features recited in FIG. 1. The bottom end of the tether (208a) is coupled to a load (210a), such as a compartment used to transport passengers and/or objects. In the example shown, the first multicopter (202a) is attached to the top end of the tether (208a), the third multicopter (206a) is closest to the transport compartment (210a), and the second multicopter (206a) is located between the other two multicopters. In some embodiments, the multicopters (202a-206a) are (substantially) equally spaced.

A benefit to detachably coupling the vertically-stacked multicopters to the vertical connector (e.g., a flexible tether, a rigid rod, or some combination of the two) is that a low-charge multicopter can be replaced with a fully-charged multicopter (e.g., mid-flight) without having all of the vertically-stacked multicopters land. This may be desirable in at least some applications because it enables the load-bearing and vertically-stacked multicopters to have a better duty cycle. In contrast, if the multicopters could not detach from the vertical connector (e.g., mid-flight), then the entire system would have to land to recharge one or more of the multicopters.

A particular concern in this vertically-stacked multicopter example is when the topmost multicopter (202a) has a low battery and needs to be recharged and/or replaced. For example, while the middle and bottom multicopters (204a and 206a) can decouple from the tether without worrying about the tether becoming entangled in any of the multicopters' propellers, the topmost multicopter must carefully detach itself without the top of the tether becoming entangled in the propellers of the middle and bottom multicopters (204a and 206a). The following diagrams give an example of how this maneuvering may be performed.

At a second point in time (220), the second multicopter (204b) ascends up the tether (208b) to a position that is closer to the first multicopter (202b). For example, the second multicopter (204b) may detach itself from the tether and ascend (e.g., vertically) while keeping the tether within a cutout of the vehicle frame and/or a funnel. When the second multicopter (204b) has reached a desired altitude, the second multicopter (204b) reattaches itself (in a detachable manner) to the tether (208b). During the ascent, the load (210b) is kept airborne by the first multicopter (202b) and the third multicopter (206b).

In general, the second multicopter (204b) gets as close as possible to the bottom of the first multicopter (202b) (e.g., possibly including some margin to avoid a rotor strike). This shortens the section of the tether located between the first multicopter (202b) and the second multicopter (204b) and reduces the likelihood of the topmost section of the tether getting tangled in any lower propeller.

At a third point in time (230), the first multicopter (202c) descends while still coupled to the tether (208c). For example, the flight path of the first multicopter (202c) during this maneuver may guide the tether between the propellers of the second multicopter (204c). In some embodiments, the first multicopter (202c) flies in a manner that guides the tether to some guide, funnel, channel, or guard included in the second multicopter (204c) that is designed to receive the tether and/or keep the tether away from the propellers of the second multicopter (204c).

After the first multicopter and/or the tether is in some desired position (e.g., the first multicopter has a lower altitude than the second multicopter, the tether is in some opening and/or funnel, etc.), the first multicopter detaches itself from the tether and flies off (e.g., for charging). See, for example, the fourth point in time (240) where only the second multicopter (204d) and third multicopter (206d) are coupled to the tether (208d).

At a fifth point in time (250), the second multicopter (204e) has ascended up the tether (208e) until it is at the top of the tether. As before, to ascend, the second multicopter (204e) may detach itself from the tether, ascend to a higher altitude, and then reattach itself to the tether. The top portion of the tether may have been in some guide, funnel, channel, or guard which permits the second multicopter (204e) to ascend up the tether while minimizing the chance of the tether getting tangled in the propellers of the second multicopter (204e).

In this example, while the second multicopter (204e) is ascending to the top of the tether, the third multicopter (206e) is carrying all of the weight of the load (210e). In some applications, it may be undesirable to have a single multicopter carry the load (e.g., for failure and/or redundancy reasons) and the minimum number of multicopters attached at any given time may be increased if desired. To put it another way, the number of multicopters shown here is merely exemplary and is not intended to be limiting.

At a sixth point in time (260), a fourth multicopter (242) that is fully charged approaches the tether (208f) to attach itself to the tether between the second multicopter (204f) and the third multicopter (206f). The second multicopter (204f) and the third multicopter (206f) are maximally spaced in the positions shown here which reduces the likelihood of a collision. It is also desirable to have no (e.g., topmost) portion of the tether be dangling when the fourth multicopter (242) attaches itself to the tether (208f).

As shown in this example, in some embodiments, the system is included in a topmost multicopter (e.g., multicopter 1 (202a-202c)) in the plurality of vertically-stacked multicopters and the system further includes a flight controller that is configured to, while the attachment sub-system is detachably coupled to the vertical connector, generate one or more control signals for the plurality of propellers associated with moving (e.g., diagram 230) to a safe position such that if the attachment sub-system were to detach from the vertical connector while in the safe position, a section of the vertical connector that is between the system and a second-from-top multicopter would be clear of one or more propellers in the second-from-top multicopter and the attachment sub-system is further configured to, while in the safe position, detach from the vertical connector (e.g., diagram 240).

As shown in this example, in some embodiments, the system is included in a second-from-top multicopter (e.g., multicopter 2 (204a-204f)) in the plurality of vertically-stacked multicopters; the attachment sub-system is further configured to: detach from the vertical connector; and after moving into a topmost position associated with the vertical connector, detachably couple to the vertical connector; and the system further includes a flight controller that is configured to: after the attachment sub-system detaches from the vertical connector, generate one or more control signals for the plurality of propellers associated with moving to the topmost position. See, for example, diagrams 240 and 250.

In some embodiments, in addition to a load-bearing (e.g., "grippy" or tight) connector, a multicopter further includes a non-load-bearing connector (e.g., a collar or a ring) that goes around the tether and does not inhibit movement up or down the tether. For example, when the second multicopter (204b) ascends up the tether (see diagram 250), a non-load-bearing connector that stays around the tether may make it easier for a load-bearing connector to reattach to the tether when the multicopter reaches a desired position. To put it another way, in some embodiments, an attachment sub-system includes a non-load-bearing connector and a load-bearing connector, where the attachment sub-system is further configured to detach the load-bearing connector from the vertical connector while keeping the non-load-bearing connector enclosed around the vertical connector and after flying vertically to a higher altitude, detachably coupling the load-bearing connector to the vertical connector. The system may further include a flight controller that is configured to, after the load-bearing connector detaches from the vertical connector, generate one or more control signals for the plurality of propellers associated with flying vertically to the higher altitude.

The following figures describe some embodiments of an attachment sub-system.

Figure 3A:
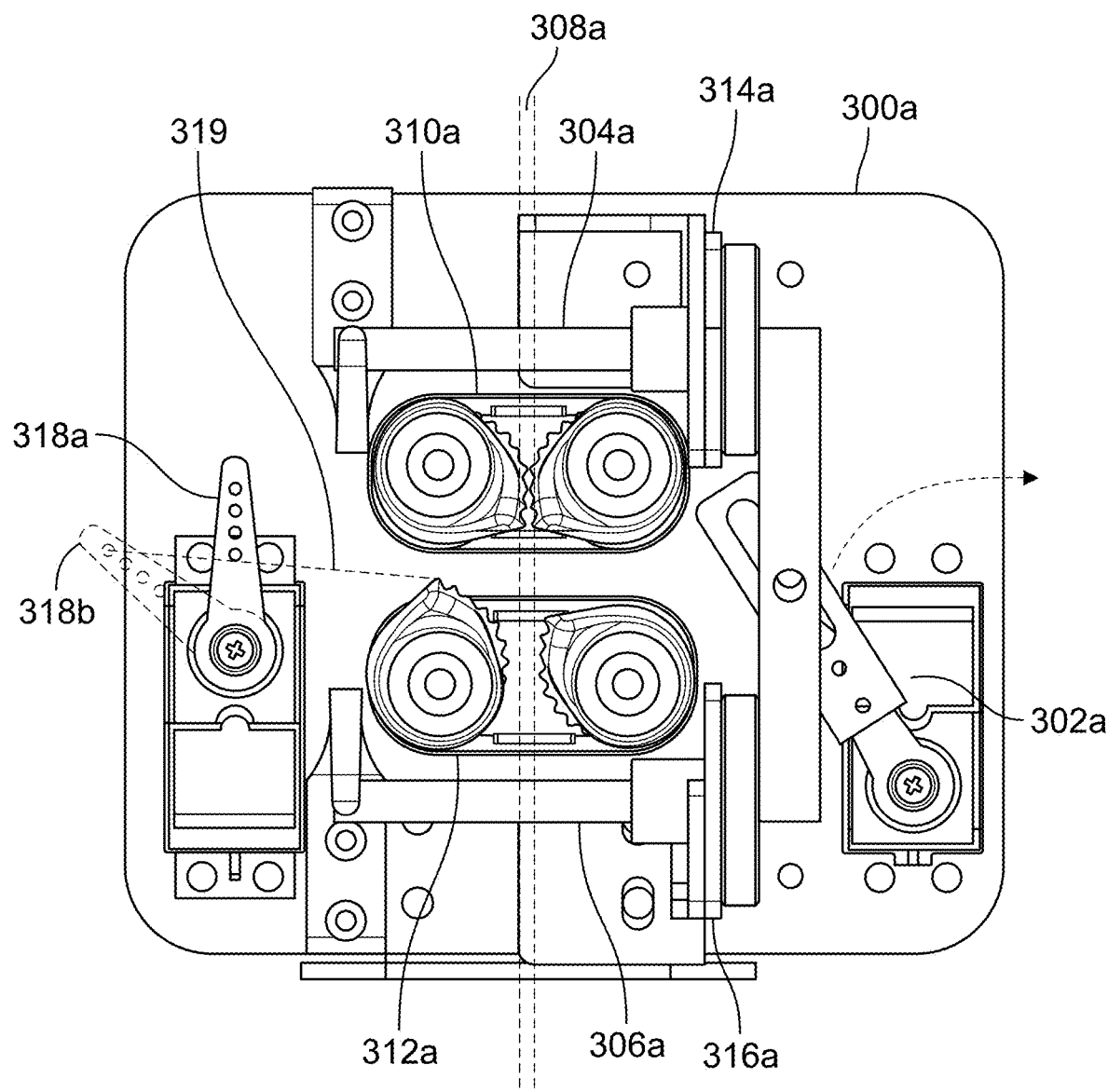
FIG. 3A is a diagram illustrating a front view of a vertical planar portion embodiment of an attachment sub-system with cam cleats and linear gates.

FIG. 3A is a diagram illustrating a front view of a vertical planar portion embodiment of an attachment sub-system with cam cleats and linear gates. In the example shown, a plate (300a) provides a vertical surface to which other components are attached. To preserve the readability of the figure, some components (e.g., some screws, connectors, etc.) are not shown.

In this example, the attachment sub-system includes two cam cleats (310a and 312a). The upper cam cleat (310a) is shown in a closed position and the lower cam cleat (312a) is shown partially open. In this example, the two cam cleats (310a and 312a) are spring-loaded (i.e., passive) devices that hold the tether (308a) between the left cam and right cam. The upper cam cleat (310a) holds the tether (308a) securely in place when the tether is pulled upwards but rotates and permits the tether (308a) to slip free when the tether is pulled downwards. To prevent the tether (308a) from unintentionally freeing itself and/or moving when the tether is pulled downwards, the lower cam cleat (312a), which is flipped upside down relative to the upper cam cleat (310a), holds the tether securely in place when the tether is pulled downwards.

To prevent the tether from accidentally and/or unintentionally detaching from one or both of the cam cleats (310a and 312a), the exemplary attachment sub-system further includes two linear gates (304a and 306a). A rotatable arm (302a) is coupled via a series of connectors to an upper linear gate (304a) and a lower linear gate (306a). The linear gate is sometimes referred to herein as a bolt. When the arm (302a) is in the position shown here, the two linear gates (304a and 306a) are closed. The two linear gates (304a and 306a) are positioned closer to plate (300a) than the front of the cam cleats (310a and 312) such that when the tether is between the cam cleats and the linear gates are closed, the linear gates prevent the tether from slipping out (e.g., laterally) from the cam cleats. If the arm (302a) were rotated clockwise, the two linear gates (304a and 306a) would slide to the right, creating an opening. In other words, to detachably couple to tether (308a), the linear gates (304a and 306a) are opened. The linear gates are then kept closed until the decoupling is desired, at which time the linear gates are opened and the plate (300a) moves (e.g., laterally) away from the tether (308a) (e.g., into the page from the view shown here).

The arm on the left (318a) is a release servo arm that is connected to one or both of the cam cleats (310a and 312a) via one or more strings, ties, or other connectors that pull open the cam cleat jaws so that the tether (308a) can be released. See, for example, the string (319) that is connected through the topmost hole in the rotated release servo arm (318b) and which pulls the left cam in the lower cam cleat (312a). In some embodiments, a similar string is attached to the upper cam cleat (310a) in addition to or as an alternative to a string attached to the lower cam cleat (312a). Without the release servo arm and its attached string(s), both the top cam cleat (310a) and bottom cam cleat (312a) would be clamping on the tether (308a), preventing the tether from releasing.

Figure 3B:
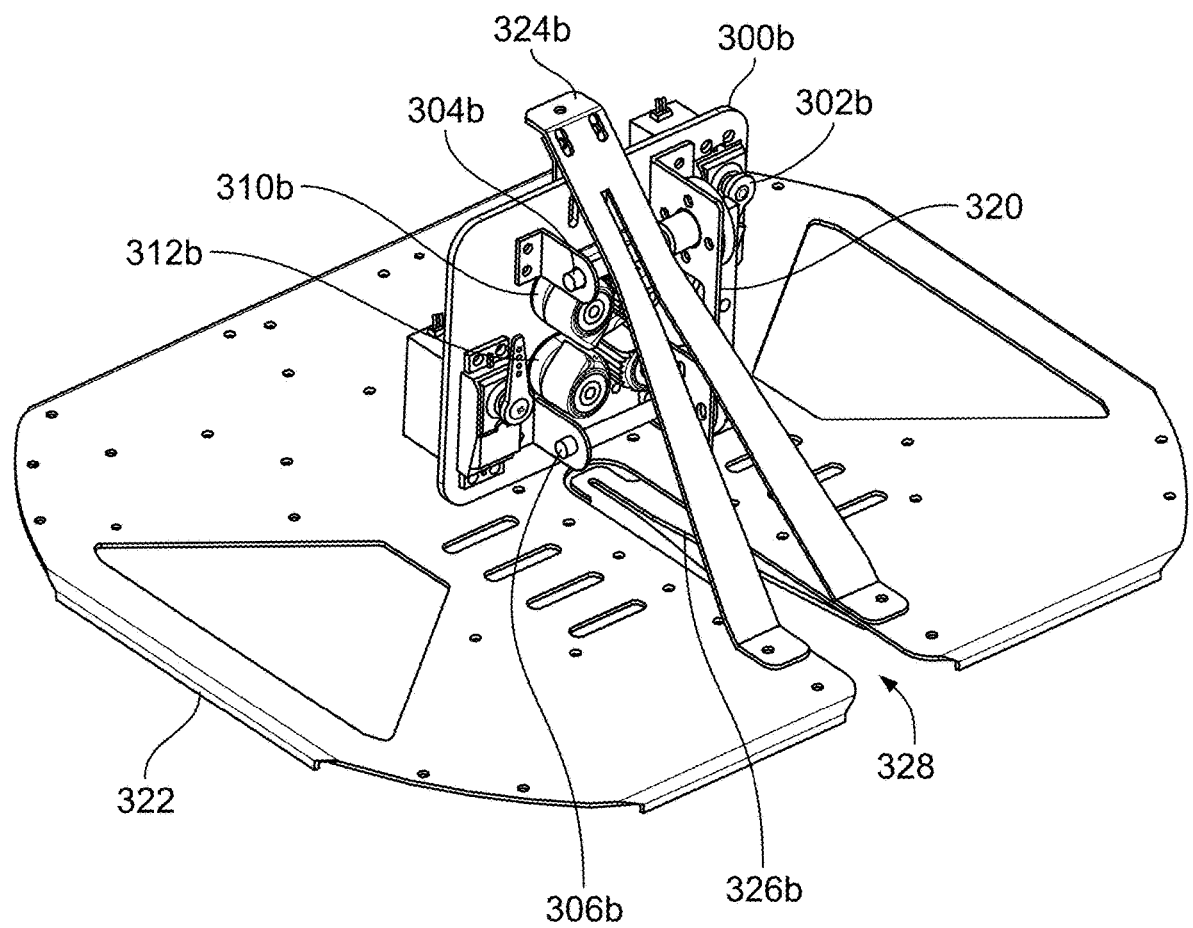
FIG. 3B is a diagram illustrating a perspective view of an attachment sub-system embodiment for a quadcopter frame.

FIG. 3B is a diagram illustrating a perspective view of an attachment sub-system embodiment for a quadcopter frame. In this example, the vertically-mounted plate (300b) is substantially similar to the vertically-mounted plate (300a) described in FIG. 3A with relatively small differences. For example, the arm (302b) that controls the linear gates (304b and 306b) is flipped upside down in this embodiment. Also, the linear gates (304b and 306b) in this embodiment have a single bracket (320) instead of separate brackets (314a and 316a in FIG. 3A) to better control the linear gates.

As shown here, the vertical plate (300b) (with the cam cleats (310b and 312b) and linear gates (304b and 306b)) is attached perpendicularly to a horizontal plate (322). In this example, the multicopter is a quadcopter and four propellers (not shown) are attached at the corners of the horizontal plate (322).

The horizontal plate (322) includes an opening or cutout (328) that extends from the edge to the center of the horizontal plate. This is one example of an opening in a vehicle frame as recited at step 104 in FIG. 1. This opening permits the tether to be attached at or near the center (e.g., of mass) of the exemplary quadcopter where the cam cleats (310b and 312b) and linear gates (304b and 306b) are located. It is noted that the cutout is located on the longer edge of the horizontal plate, for example, to maximize the distance between the propellers and the tether and reduce the likelihood of the tether becoming entangled with the propeller blades during attachment or detachment.

Two funnels (324b and 326b) are used to help guide the tether towards space between the cam cleats (310b and 312b) and the open (not shown here) linear gates (304b and 306b) during attachment. In this example, the upper funnel (324b) is attached to the top of the vertically-mounted plate (300b) at one end and to the top surface of the horizontal plate (322) at the other end. The lower funnel (326b) is parallel to the horizontal plate (322) and is attached to the bottom surface of the horizontal plate.

To release the tether, the linear gates are opened, and the multicopter flies (e.g., laterally) away from the tether (e.g., with the other multicopters possibly flying laterally in the opposite direction to help decouple the tether and departing multicopter).

Figure 3C:
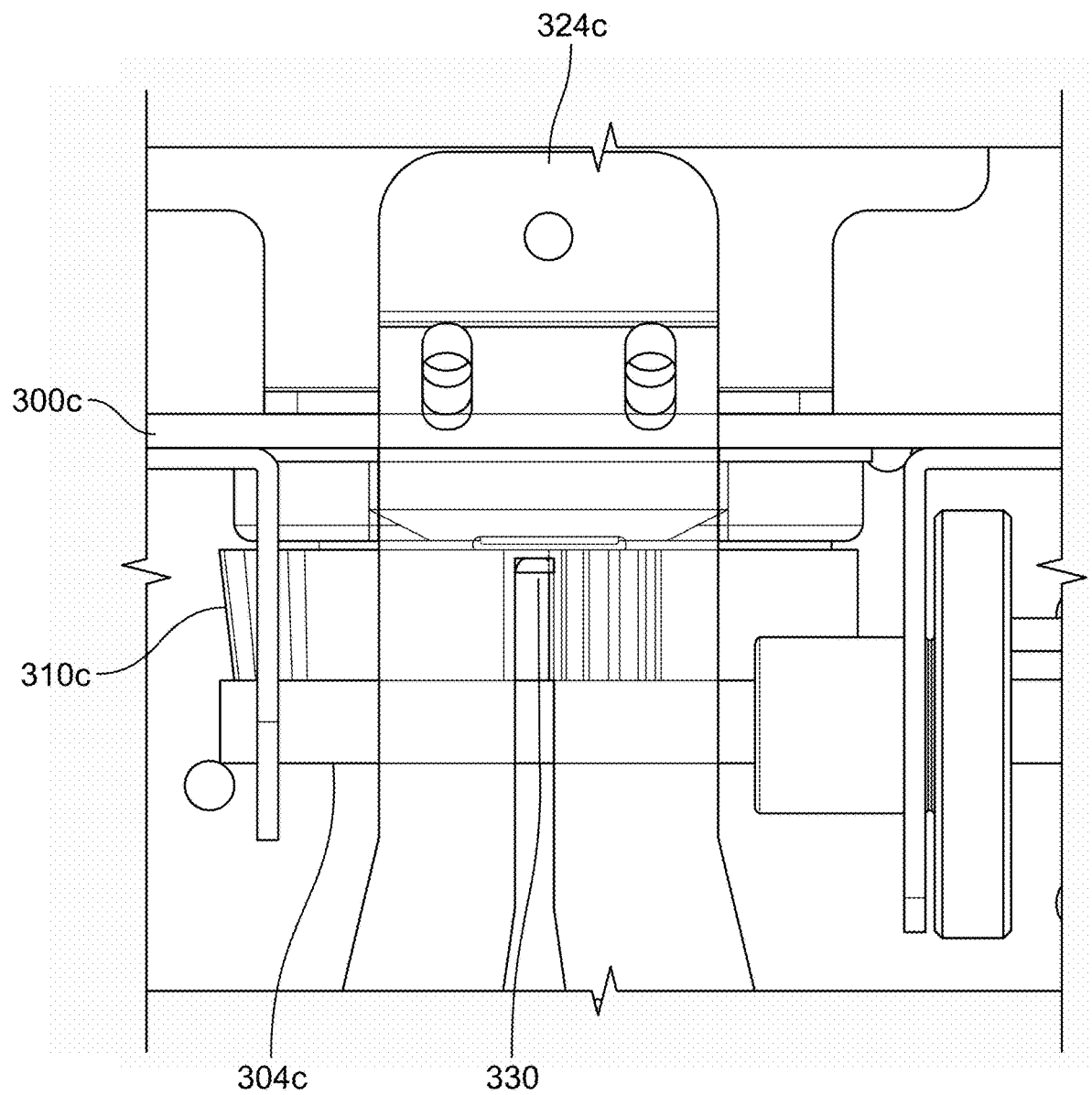
FIG. 3C is a diagram illustrating a top view of an attachment sub-system embodiment showing a funnel that prevents a tether from getting stuck in a cam cleat.

FIG. 3C is a diagram illustrating a top view of an attachment sub-system embodiment showing a funnel that prevents a tether from getting stuck in a cam cleat. In this example, the upper linear gate (304c), upper cam cleat (310c), upper funnel (324c), and vertically-mounted plate (300c) are visible. As shown here, when the upper linear gate (304c) is closed (as shown), the linear gate will hold the tether (not shown) between the cam cleats and will prevent the tether from unintentionally and/or inadvertently sliding out the front of the cam cleats.

It is noted that the back (330) of the opening of the upper funnel (324c) keeps the tether from getting too deep into the upper cam cleat (310c). If the tether became wedged in the back of a cam cleat it could make decoupling difficult. To that end, the back of the opening of the upper funnel is positioned so that it blocks access to the back of the upper cam cleat's opening.

Figure 3D:
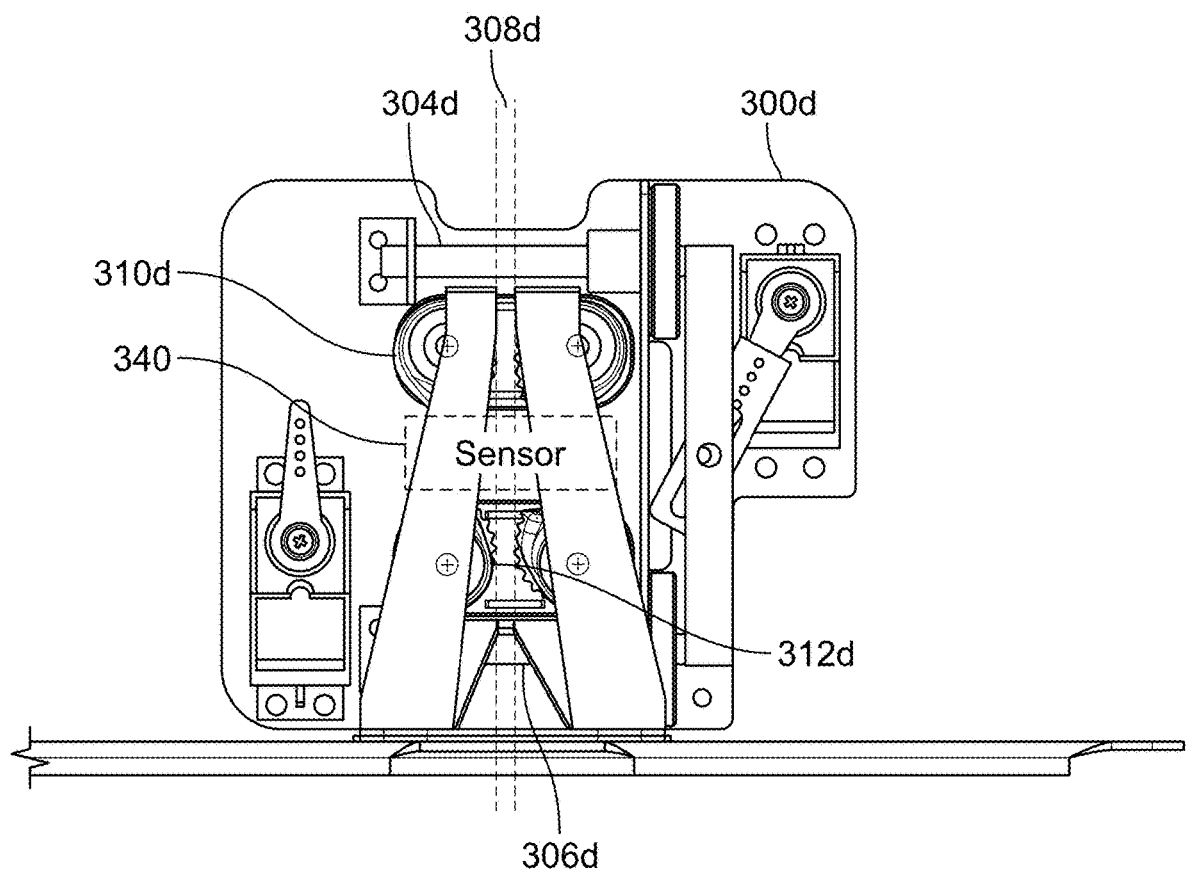
FIG. 3D is a diagram illustrating a front view of an attachment sub-system embodiment with a beam break sensor.

FIG. 3D is a diagram illustrating a front view of an attachment sub-system embodiment with a beam break sensor. In this example, a beam break sensor (340) is used to detect when a tether (308d) is positioned between the grips of the cam cleats (310d and 312d) so that the linear gates (304d and 306d) can be closed (e.g., automatically). For example, suppose a multicopter is (e.g., laterally) approaching a tether (308d) to detachably couple to the tether. See, e.g., the fourth multicopter (242) shown in FIG. 2. The linear gates (304d and 306d) would be open (not shown here) and the multicopter would fly towards the tether.

In this example, the beam break sensor (340) is attached to the vertically-mounted plate (300d) between the two cam cleats (310d and 312d) with the beam emitted parallel to the vertically-mounted plate. When the tether breaks the sensor's beam, that indicates that the tether is in the grip of the cam cleats. The breaking of the beam therefore automatically causes the linear gates to close (at least in this example), preventing the tether from unintentionally and/or accidentally escaping from the cam cleats.

In some embodiments, a beam break sensor is positioned and/or directed in some other manner. For example, funnel surfaces may be good candidates for beam brake sensors because the tether or other vertical connector will have to pass through the opening or channel of the funnel.

Figure 3E:
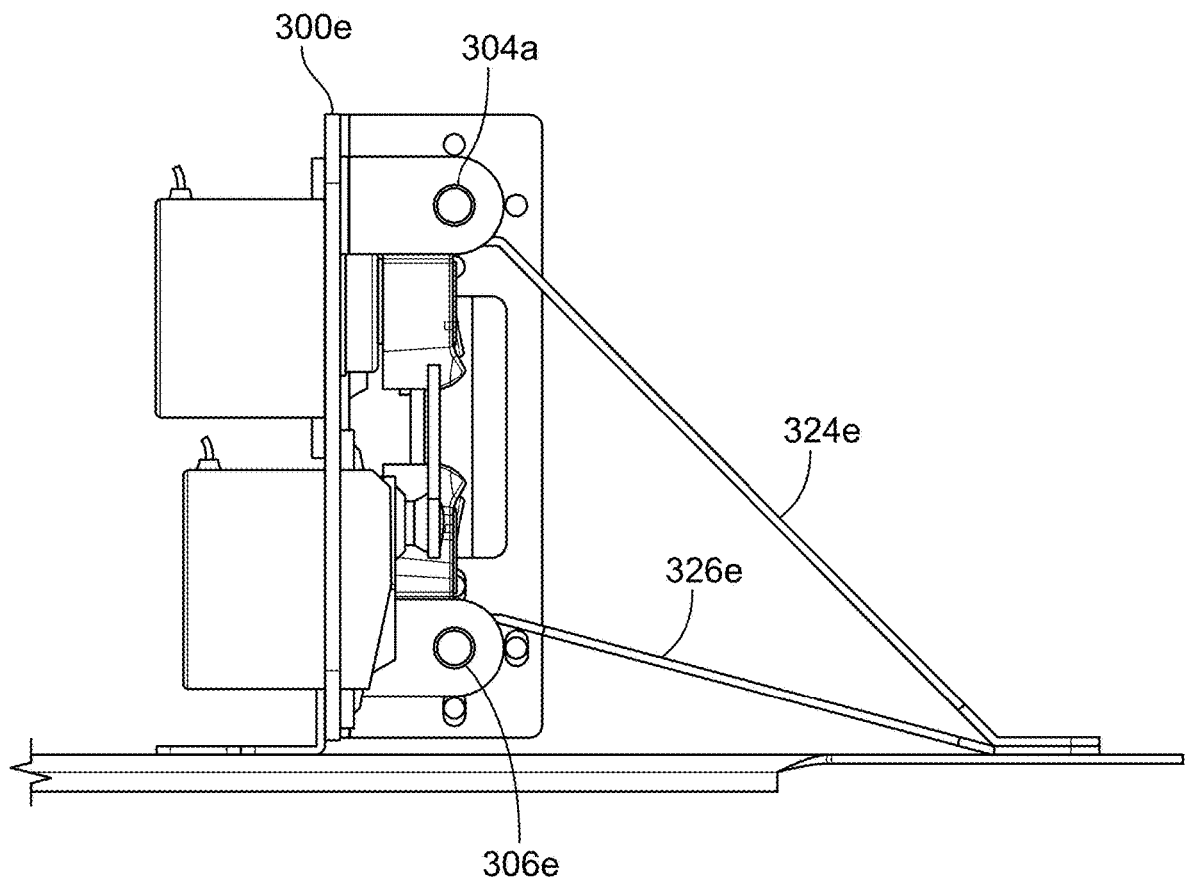
FIG. 3E is a diagram illustrating a side view of an attachment sub-system embodiment with an alternate arrangement of funnels.

FIG. 3E is a diagram illustrating a side view of an attachment sub-system embodiment with an alternate arrangement of funnels. In this example, the upper funnel (324e) and lower funnel (326e) are attached below the upper linear gate (304e) and above the lower linear gate (306e), respectively. For example, the tops of the funnels may be attached to the vertically-mounted plate (300e), or to some horizontal crossbar (not visible from this view) between left and right brackets that hold the linear gates at their distal end and near end. The funnel placement shown here reduces the spacing between the two funnels (e.g., compared to the examples above) which in turn lowers the relative pitch angle risk during tether capture.

Figure 4:
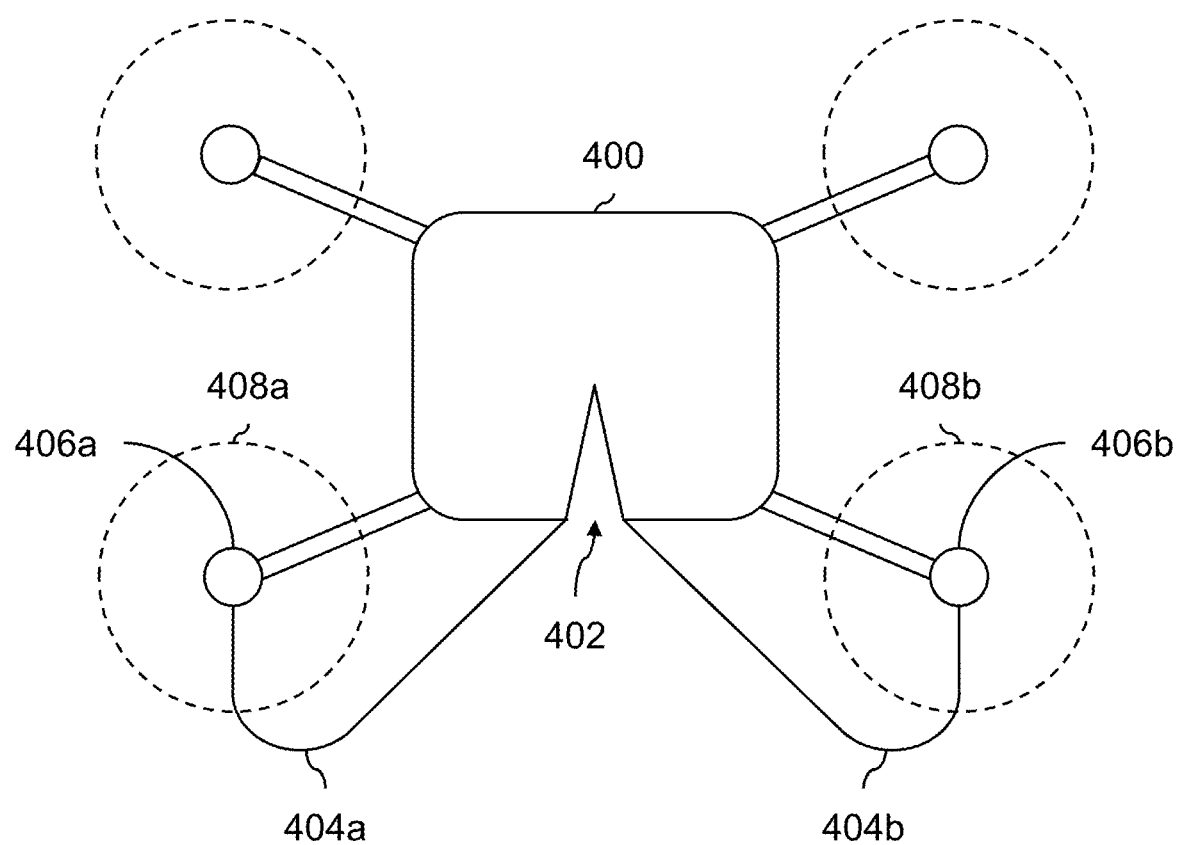
FIG. 4 is a diagram illustrating an embodiment of a guard.

FIG. 4 is a diagram illustrating an embodiment of a guard. In this example, a top view of a quadcopter is shown where the vehicle frame (400) has an opening (402) via which a tether (not shown) can gain access to the center of the frame where an attachment sub-system (not shown) can detachably couple the tether and quadcopter.

In this example, the quadcopter has a left guard (404a) and a right guard (404b) which are attached on one end to the vehicle frame (400) near the opening (402). The other ends of the guards are attached to a (e.g., cylindrically-shaped) left-front housing (406a) and right-front housing (406b) that includes (for example) the motor for that propeller. The guards (404a and 404b) extend forward from the front motor housings (406a and 406b) until they are past the strike zones (408a and 408b) and then turn back towards opening (402) in the vehicle frame (400). This shape of the guards helps to prevent the tether from becoming entangled in the propeller blades and to guide the tether into the opening in the vehicle frame. In some embodiments, the guard is made of a metal tube or bar (e.g., an aluminum tube ⅜ of an inch thick).

As described above, in some embodiments, a vertical connector includes mechanical stoppers which permit the attachment sub-system to detachably coupled to the vertical connector by (e.g., loosely) encircling or surrounding the vertical connector. First, some examples of such a system are described without showing specific attachment sub-system to provide context and/or background. Then, some specific attachment sub-system embodiments are described.

As an alternative to attachment mechanism embodiments that tightly grip the vertical connector, in some embodiments the vertical connector has features at certain intervals that serve as stoppers so that the attachment subsystem does not have to tightly grab on to the vertical connector in order to be load-bearing. The following figures show some examples of this.

Figure 5:
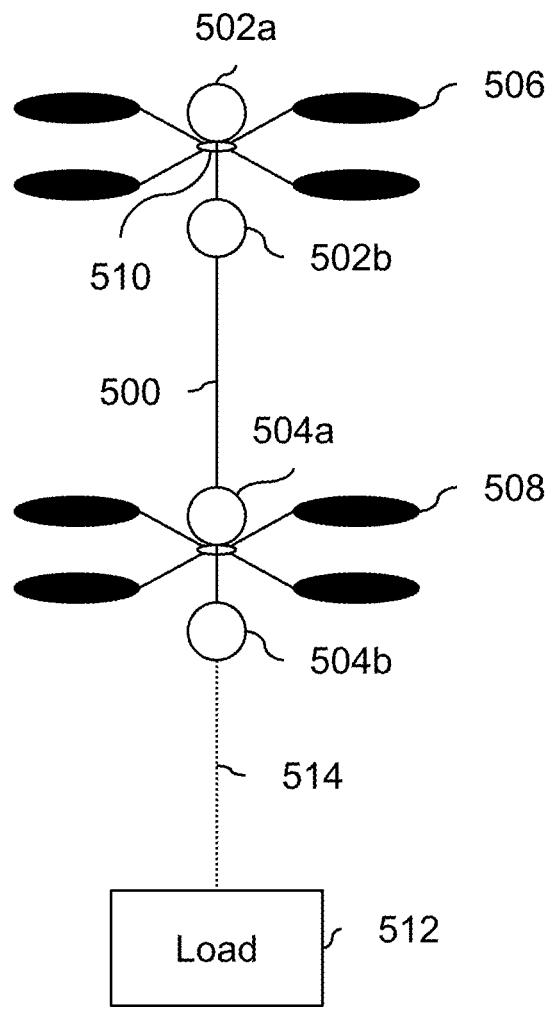
FIG. 5 is a diagram illustrating an embodiment of a vertical connector which includes a rigid portion, a flexible portion, and stoppers.

FIG. 5 is a diagram illustrating an embodiment of a vertical connector which includes a rigid portion, a flexible portion, and stoppers. In this example, the vertical connector has two sections made of different materials and/or having different rigidities. The upper portion of the vertical connector is a (e.g., rigid) rod (500). This rigid section includes two pairs of stoppers; and upper pair of stoppers (502a and 502b) and a lower pair of stoppers (504a and 504b). In various embodiments, the stoppers may be knots, stopper balls, or other embedded or attached geometries such as cones (e.g., to permit a multicopter to move in one direction, such as up the vertical connector).

Between each pair of stopper balls is a multicopter: the upper multicopter (506) is between the two upper stoppers (502a and 502b) and the lower multicopter (508) is between the two lower stoppers (504a and 504b). The multicopters have an openable ring (510), such as a ring lock or other enclosure which includes a linear gate, which is part of the exemplary attachment sub-system. With the ring open, a multicopter flies laterally so that a section of the rod between two stoppers passes through to the opening. The opening is then closed. The multicopter can then climb or otherwise ascend until the ring (e.g., 510) is in contact with the stopper feature (e.g., 502a). The stoppers are larger than the rings so the rings (and the attached multicopters) cannot pass through. As such, the multicopter becomes load-bearing and begins to carry the weight of the load (512) at the bottom of the vertical connector.

Having the upper portion of a vertical connector be rigid may be desirable in some applications because the upper portion will not fall down (e.g., potentially becoming entangled in the propeller blades of a lower multicopter) even if the topmost multicopter (506) decouples from the vertical connector and flies off.

Although the lower stopper feature in each pair is not necessary for load bearing purposes, a lower stopper may be desirable in some applications because it prevents the line from being pulled up through a multicopter by another, higher multicopter and/or prevents a multicopter from falling to the ground if that multicopter fails.

The portion of the vertical connector that is between the lowest stopper ball (504b) and the load (512) is a (e.g., flexible) tether (514). In some embodiments, multicopters can detachably couple to the flexible portion (514) of the vertical connector, for example by using an attachment sub-system that tightly grabs the flexible tether (514).

In some applications, a passive attachment sub-system that is configured to hold stoppers in or attached to a vertical connector is desirable. For example, such embodiments have the benefit of simplicity because they have no moving parts. The following figure shows one such passive embodiment.

Figure 6:
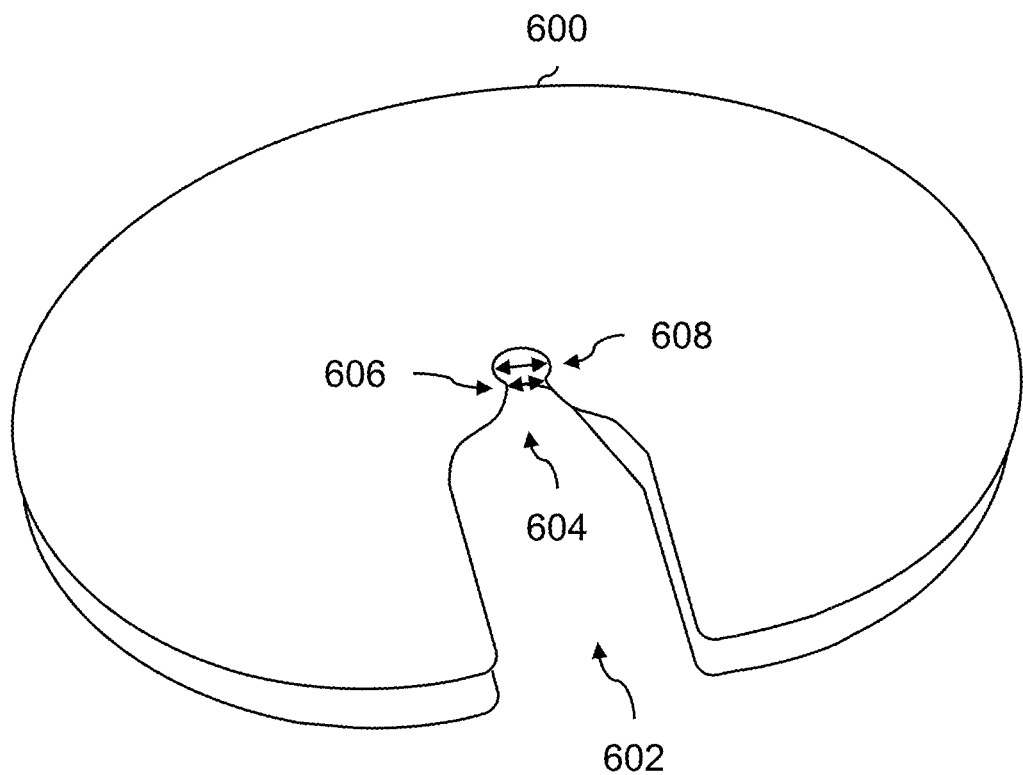
FIG. 6 is a diagram illustrating an embodiment of a passive attachment sub-system that is configured to hold stoppers.

FIG. 6 is a diagram illustrating an embodiment of a passive attachment sub-system that is configured to hold stoppers. In this example, the vehicle frame (600) of a multicopter (in the associated prototype, an octocopter) is shown. As shown here, in some embodiments, a vehicle has a opening (602) at the end of which is a circular and passive holder (604) that is designed to hold an (e.g., upper) stopper that is part of or attached to a (e.g., rigid or flexible) vertical connector. The opening of the circular holder (604) is wider than the diameter or thickness of the vertical connector, so that the octocopter can fly laterally and approach the vertical connector between a pair of stoppers. The opening (i.e., diameter) of the circular shape of the holder (604) is smaller than the diameter of the stopper feature, so that the stopper feature cannot pass through the circular holder (604) and the vehicle can passively hold or couple with the vertical connector and become load-bearing.

As shown in this example, in some embodiments, the vertical connector includes a stopper and the attachment sub-system includes a passive holder (e.g., 604) that is open on at least one side where an opening of the passive holder (e.g., 606) is narrower than a width of the passive holder (e.g., 608).

In some embodiments, when the octocopter is flying forwards to transport the load (e.g., at a fixed altitude), the octocopter orients itself to minimize the likelihood of the multicopter and vertical connector from unexpectedly decoupling. For example, the exemplary octocopter may fly with the opening (602) facing forwards when the octocopter is flying laterally (e.g., at a fixed altitude) so that the stopper and vertical connector are pushed against the side of the circular holder (604) opposite the opening.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
 a plurality of propellers;
 a beam break sensor having a beam and an indication signal;
 a movable gate, wherein:
  a plurality of vertically-stacked multicopters detachably couples to a vertical connector to transport a load that is detachably coupled to the vertical connector; and
  in the event the indication signal of the beam break sensor indicates the vertical connector has broken the beam, the movable gate is configured to close so that the vertical connector is enclosed at least in part by the movable gate; and
 a frame that includes an opening that provides access for the vertical connector to access the beam of the beam break sensor.

2. The system recited in claim 1, wherein the movable gate includes a linear gate.

3. The system recited in claim 1, wherein the vertical connector includes a tether.

4. The system recited in claim 1, wherein the plurality of propellers generates vertical thrust at least some of the time.

5. The system recited in claim 1, further including a first spring-loaded device and a second spring-loaded device that are configured to detachably couple to the vertical connector, wherein:
- in the event the vertical connector is pulled in a first direction, the first spring-loaded device holds the vertical connector in place; and
- in the event the vertical connector is pulled in a second direction that is opposite to the first direction, the second spring-loaded device holds the vertical connector in place.

6. The system recited in claim 1, further including a first spring-loaded device and a second spring-loaded device that are configured to detachably couple to the vertical connector, wherein:
- in the event the vertical connector is pulled in a first direction, the first spring-loaded device holds the vertical connector in place;
- in the event the vertical connector is pulled in a second direction that is opposite to the first direction, the second spring-loaded device holds the vertical connector in place; and
- at least one of the first spring-loaded device or the second spring-loaded device includes a cam cleat.

7. The system recited in claim 1, wherein:
- the system further includes a propeller blade guard;
- the propeller blade guard is coupled at one side to a motor housing associated with at least one of the plurality of propellers; and
- the propeller blade guard is coupled at another side to the opening of the frame.

8. The system recited in claim 1, wherein:
- the vertical connector includes a mechanical stopper;
- the closure of the movable gate creates an enclosure that includes the movable gate; and
- the mechanical stopper is larger than the enclosure, such that the vertical connector cannot move, at least in one direction and at least past a certain point, when the movable gate is closed.

9. A method, comprising:
- receiving an indication signal from a beam break sensor that has a beam, wherein a plurality of vertically-stacked multicopters detachably couples to a vertical connector to transport a load that is detachably coupled to the vertical connector; and
- in the event the indication signal of the beam break sensor indicates the vertical connector has broken the beam, closing a movable gate so that the vertical connector is enclosed at least in part by the movable gate, wherein the beam break sensor and the movable gate are included in a system that further includes:
  - a plurality of propellers; and
  - a frame that includes an opening that provides access for the vertical connector to access the beam of the beam break sensor.

10. The method recited in claim 9, wherein the movable gate includes a linear gate.

11. The method recited in claim 9, wherein the vertical connector includes a tether.

12. The method recited in claim 9, wherein the plurality of propellers generates vertical thrust at least some of the time.

13. The method recited in claim 9, further including: detachably coupling a first spring-loaded device and a second spring-loaded device to the vertical connector, wherein:
- in the event the vertical connector is pulled in a first direction, the first spring-loaded device holds the vertical connector in place; and
- in the event the vertical connector is pulled in a second direction that is opposite to the first direction, the second spring-loaded device holds the vertical connector in place.

14. The method recited in claim 9, further including: detachably coupling a first spring-loaded device and a second spring-loaded device to the vertical connector, wherein:
- in the event the vertical connector is pulled in a first direction, the first spring-loaded device holds the vertical connector in place;
- in the event the vertical connector is pulled in a second direction that is opposite to the first direction, the second spring-loaded device holds the vertical connector in place; and
- at least one of the first spring-loaded device or the second spring-loaded device includes a cam cleat.

15. The method recited in claim 9, wherein:
- the method further includes providing a propeller blade guard;
- the propeller blade guard is coupled at one side to a motor housing associated with at least one of the plurality of propellers; and
- the propeller blade guard is coupled at another side to the opening of the frame.

16. The method recited in claim 9, wherein:
- the vertical connector includes a mechanical stopper;
- the closure of the movable gate creates an enclosure that includes the movable gate; and
- the mechanical stopper is larger than the enclosure, such that the vertical connector cannot move, at least in one direction and at least past a certain point, when the movable gate is closed.

* * * * *